United States Patent [19]

Ginger

[11] 4,170,627
[45] Oct. 9, 1979

[54] PROCESS FOR THE SIMULTANEOUS SEPARATION OF SULFUR AND NITROGEN OXIDES FROM A GASEOUS MIXTURE

[75] Inventor: Edward A. Ginger, Northbrook, Ill.

[73] Assignee: UOP Inc., Des Plaines, Ill.

[21] Appl. No.: 894,959

[22] Filed: Apr. 10, 1978

[51] Int. Cl.$^2$ .............................................. B01D 53/34
[52] U.S. Cl. .................................... 423/239; 423/244; 252/472
[58] Field of Search ...................... 423/213.5, 239, 244, 423/351; 252/472

[56] References Cited

U.S. PATENT DOCUMENTS

| 2,975,025 | 3/1961 | Cohn ....................................... 423/239 |
| 3,784,675 | 1/1974 | Kobylinski et al. ............... 423/213.5 |

FOREIGN PATENT DOCUMENTS

| 738479 | 12/1932 | France ...................................... 252/472 |
| 1438119 | 6/1976 | United Kingdom ...................... 423/239 |

OTHER PUBLICATIONS

Katzer, J. R., in *The Catalytic Chemistry of Nitrogen Oxides*, Plenum Press, N.Y., 1975, pp. 160–162.

*Primary Examiner*—G. O. Peters
*Attorney, Agent, or Firm*—James R. Hoatson, Jr.; Robert W. Welch; William H. Page, II

[57] ABSTRACT

An improved process for the simultaneous separation of sulfur and nitrogen oxides from a gaseous mixture containing said oxides and oxygen is disclosed. The gaseous mixture and ammonia are contacted with a solid sulfur oxides acceptor comprising copper, copper oxide, or mixture thereof dispersed on a carrier material in combination with ruthenium and rhenium or the oxides thereof.

7 Claims, No Drawings

PROCESS FOR THE SIMULTANEOUS SEPARATION OF SULFUR AND NITROGEN OXIDES FROM A GASEOUS MIXTURE

It has become well known that the oxides of sulfur and nitrogen resulting, for example, from the combustion or air oxidation of high sulfur coal or fuel oil, are among the major pollutants of our environment. Nitrogen oxides discharged to the atmosphere are considered to be largely responsible for the formation of what has come to be known as smog—a major source of atmospheric pollution. Sulfur oxides, discharged to the atmosphere from all sources, measure in the millions of tons on an annual basis, and the increasingly deleterious effect of said oxides, as well as the nitrogen oxides, with respect to cardiorespiratory disease, eye irritation, and the like, has prompted rather severe legislative action governing the discharge of said pollutants, particularly in the more densely populated areas where the problem is more acute. In particular, it has been recognized that sulfur oxides discharged to the atmosphere as a component of flue gases from industrial furnaces burning high sulfur coal or fuel oil constitute a substantial if not major portion of the total sulfur oxides discharged to the atmoshere.

Sulfur oxides are conveniently separated from an oxygen-containing gas mixture, such as flue gas, on contacting the mixture with a solid acceptor at an elevated temperature. Typically, the solid acceptor comprises a supported copper and/or copper oxide capable of retaining the sulfur oxides as a sulfate. The process can be used to remove sulfur oxides from flue gases so that the latter may be freely discharged to the atmosphere. Since the solid acceptor requires frequent regeneration, the process generally comprises a repeating acceptance-regeneration cycle. During regeneration, the sulfate is decomposed at an elevated temperature in the presence of a reducing gas to yield a regenerated acceptor and a regeneration off-gas of increased sulfur dioxide concentration. This off-gas is useful, for example, in the manufacture of sulfuric acid and elemental sulfur.

It is an object of this invention to present an improvement to said process whereby nitrogen oxides are separated substantially simultaneously with the sulfur oxides from a gaseous mixture comprising said oxides and oxygen.

In one of its broad aspects, this invention embodies a process for the simultaneous separation of oxides of sulfur and nitrogen from a gaseous mixture comprising said oxides and oxygen which comprises contacting said mixture and ammonia with a solid sulfur oxides acceptor at a temperature of from about 150° to about 450° C., said solid acceptor comprising copper, copper oxide or mixture thereof dispersed on a carrier material in combination with ruthenium and rhenium or the oxides thereof.

Another embodiment of this invention concerns a process which comprises contacting said gaseous mixture and ammonia with a solid sulfur oxides acceptor at a temperature of from about 150° to about 450° C., said solid acceptor comprising copper, copper oxide, or mixture thereof dispersed on an alumina support or carrier material in combination with ruthenium and rhenium or the oxides thereof, said alumina having a surface area of at least about 50 m²/gm.

One of the more specific embodiments of this invention relates to a process which comprises contacting said gaseous mixture and ammonia with a solid sulfur oxides acceptor at a temperature of from about 150° to about 450° C., said ammonia being employed in from about a 0.5:1 to about a 2.5:1 mole ratio with the nitrogen oxides content of said gaseous mixture, and said solid acceptor comprising from about 5 to about 15 wt. % copper, copper oxide, or mixture thereof dispersed on a gamma-alumina support or carrier material in combination with ruthenium and rhenium or the oxides thereof, each of the ruthenium and rhenium components comprising from about 0.01 to about 2.0 wt. % of said solid acceptor calculated as the elemental metal, and thereafter regenerating said solid acceptor by heating the same in contact with a reducing gas comprising hydrogen and from about 50 to about 90 vol. % steam.

Other objects and embodiments of this invention will become apparent in the following detailed specification.

In the art relating to the separation of sulfur oxides from a gaseous mixture comprising sulfur oxides and oxygen, solid acceptors comprising copper, copper oxide or a mixture thereof are well known. The copper component is most often dispersed on a refractory inorganic oxide carrier material. Refractory inorganic oxides suitable for use include natuarally occurring materials, for example, clays and silicates such as fuller's earth, attapulgus clay, feldspar, halloysite, montmorillonite, kaolin, and diatomaceous earth, frequently referred to as siliceous earth, diatomaceous silicate, kieselguhr, and the like, and the naturally occurring material may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia, and the like, are also suitable. Alumina is a preferred refractory inorganic oxide, and the alumina may be any of the various hydrous aluminum oxides or alumina gels including alpha-alumina monohydrate (boehmite), alpha-alumina trihydrate (gibbsite), beta-alumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 50 to about 500 m²/gm., especially gamma-alumina and eta-alumina resulting from the thermal treatment of boehmite alumina and bayerite alumina, respectively, generally at a temperature of from about 400° to about 1000° C. The refractory inorganic oxide may be employed in any suitable shape or form including spheres, pills, extrudates, granules, briquettes, rings, etc. The copper content of the solid acceptor, present as copper and/or copper oxide, but calculated as the elemental metal, is generally in the range of from about 1 to about 25 wt. % depending at least in part on the available surface area of the selected carrier material. The copper component, calculated as the elemental metal, will preferably comprise from about 5 to about 15 wt. % of the solid acceptor.

Pursuant to the present invention, the copper component is dispersed on the selected carrier material in combination with ruthenium and rhenium or the oxides thereof. The ruthenium component employed in combination with the rhenium component effects an unexpected improvement in the nitrogen oxides conversion activity of the solid acceptor. The improvement resulting from the inclusion of the ruthenium-rhenium combination as a component of the solid acceptor is unexpected in view of the lack of improvement in nitrogen oxides conversion resulting from the inclusion of platinum or palladium in combination with rhenium. The ruthenium component in combination with the rhenium component also further improves the capacity of the solid acceptor for sulfur oxides while effecting substantially complete suppression of sulfur oxides breakthrough during the acceptance phase of the operation before said capacity is achieved. And a still further improvement is in the regeneration characteristics of the solid acceptor, regeneration being effected at a faster rate and to a greater extent. In any case, each of the ruthenium and rhenium components will suitably comprise from about 0.01 to about 2.0 wt. % of the solid acceptor, calculated as the elemental metal.

The solid acceptor herein contemplated may be prepared in any conventional or otherwise convenient manner. It is a preferred practice to impregnate the desired metal component on a preformed support or carrier material from an aqueous solution of a precursor compound of said metal component, the impregnated carrier material being subsequently dried and calcined to form the desired metal component dispersed on the carrier material. Precursor compounds preferably include the soluble halides, oxides and nitrates decomposable to the desired metal component upon calcination. The metal components are preferably and advantageously impregnated on the selected carrier material from a common impregnating solution thereof.

The solid acceptor of this invention is suitably employed in a fixed bed type of operation utilizing two or more reactors alternating between the acceptance and regeneration phases of the operation to provide a continuous process. The sulfur oxides acceptance phase is usually effected at a temperature of from about 150° to about 450° C. as provided by hot flue gases, a temperature of from about 350° to about 450° C. being preferred. The regeneration phase is carried out at an elevated temperature in the presence of a reducing gas—usually a hydrogen and/or carbon monoxide-containing gas mixture diluted with nitrogen, steam, or other suitable diluents. The acceptor is preferably and advantageously regenerated in contact with a reducing gas comprising carbon monoxide and hydrogen in a mole ratio of from about 0.5:1 to about 1.5:1. Regeneration is further advantageously effected in the presence of steam and regeneration gas preferably comprising from about 50 to about 90 vol. % steam to further inhibit the formation of copper sulfide. Regeneration temperatures may vary over a relatively wide range, but preferably are in the range of from about 350° to about 450° C.

The following examples are presented in illustration of the improvement resulting from the practice of this invention and are not intended as an undue limitation and the generally broad scope of the invention as set out in the appended claims.

EXAMPLE I

In the preparation of a solid acceptor representative of the prior art, 1/16" spheroidal gamma-alumina particles were employed as a carrier material. The spheroidal particles, precalcined in air for 2 hours at about 1000° C., had an average bulk density of about 0.55 gms/cc, an average pore volume of about 0.31 cc per gm, an average pore diameter of about 129 Angstroms, and a surface area of about 96 m²/gms. 300 gms. of the spheroidal alumina particles were immersed in an impregnating solution of 60.78 gms. of copper nitrate trihydrate dissolved in 400 ml of water. The alumina spheres were tumbled in the solution at ambient temperature conditions for about ½ hour utilizing a steam-jacketed rotary dryer. Steam was thereafter applied to the dryer jacket and the solution evaporated to dryness in contact with the tumbling spheres. The impregnated spheres were then calcined in air for 2 hours at about 535° C. to yield a solid acceptor containing 5 wt. % copper. This solid acceptor is hereinafter referred to as Acceptor I.

EXAMPLE II

In this example, representing one preferred embodiment of this invention, 1/16" spheroidal gamma-alumina particles, substantially as described in Example I, were utilized as a carrier material. The spheroidal particles, precalcined in air at about 1000° C. for about 2 hours, had an average bulk density of about 0.55 gms/cc, an average pore volume of about 0.27 cc per gm., an average pore diameter of about 120 Angstroms, and a surface area of about 90 m²/gm. 65 gms. of the spheroidal particles were immersed in an impregnating solution contained in a steam-jacketed rotary dryer and prepared by dissolving 13.21 gms. of copper nitrate trihydrate, 0.112 gms. of ruthenium tetrachloride pentahydrate, and 0.088 gms. of rhenium heptoxide in 87 ml. of water. The spheres were tumbled in the solution at ambient temperature conditions for about ½ hour. Steam was thereafter applied to the dryer jacket and the solution evaporated to dryness in contact with the tumbling spheres. The impregnated spheres were then calcined in air for about 1 hour at 535° C. to yield a solid acceptor containing about 5 wt. % copper and about 0.05 wt. % ruthenium and 0.05 wt. % rhenium. The solid acceptor of this example is hereinafter referred to as Acceptor II.

EXAMPLE III

This example is presented to demonstrate the poor nitrogen oxides conversion resulting when platinum is substituted for the ruthenium component of the solid acceptor of this invention, both platinum and ruthenium being members of the platinum group metals of Group VIII of the periodic table. In this example, 1/16" alumina spheres, substantially as described in the previous examples, were immersed in an impregnating solution contained in a steam-jacketed rotary dryer. In this instance, the impregnating solution was prepared by dissolving about 13.2 gms. of copper nitrate trihydrate, 10.52 milliliters of chloroplatinic acid solution (3.08 milligrams of platinum per milliliter), and 2.24 milliliters of perrhenic acid solution (10 milligrams of rhenium per milliliter) in 100 milliliters of water. The spheres were tumbled in the solution for about ½ hour at ambient temperature conditions after which steam was applied to the dryer jacket and the solution evaporated to dryness in contact with the tumbling spheres. The impregnated spheres were calcined in air at about 535° C. for one hour to yield a solid acceptor containing 5 wt. % copper, 0.05 wt. % platinum and 0.05 wt. % rhenium. The solid acceptor of this example is hereinafter referred to as Acceptor III.

EXAMPLE IV

This example is presented to further demonstrate the poor nitrogen oxides conversion resulting when palladium is substituted for the ruthenium component of the solid acceptor of this invention, both palladium and ruthenium being members of the platinum group metals of Group VIII of the periodic table. In this example, 1/16" alumina spheres, substantially as described in the previous examples, were immersed in an impregnating solution contained in a steam-jacketed rotary dryer. In this instance, the impregnating solution was prepared by dissolving about 13.2 gms. of copper nitrate trihydrate, 10.8 milliliters of chloropalladic acid solution (3 milligrams of palladium per milliliter) and 2.24 milliliters of perrhenic acid solution (10 milligrams of rhenium per milliliter) and 100 milliliters of water. The spheres were tumbled in the solution for about ½ hour at ambient temperature conditions after which steam was applied to the dryer jacket and the solution evaporated to dryness in contact with the tumbling spheres. The impregnated spheres were calcined in air at about 535° C. for one hour to yield a solid acceptor containing 5 wt. % copper, 0.05 wt. % palladium and 0.05 wt. % rhenium. The solid acceptor of this example is hereinafter referred to as Acceptor IV.

A comparative evaluation of the described solid acceptors was effected. 50 cc of the acceptor was in each case disposed as a fixed bed in a vertical tubular reactor with a $\frac{7}{8}$" inside diameter. The acceptors were first evaluated with respect to a gaseous mixture comprising about 0.2 vol. % sulfur dioxide, 0.075 vol. % nitrogen oxides, 3 vol, % oxygen, 15 vol. % steam, 0.075 vol. % ammonia and about 81.6 vol. % nitrogen. The acceptors were then further evaluated with respect to a gaseous mixture differing from the first only in the ammonia content—the ammonia comprising 0.1125 vol. % of the mixture in the latter case. The acceptor of Example I evaluated with respect to the first mentioned gaseous mixture is hereinafter referred to as Acceptor I$a$, and the acceptor of Example I evaluated with respect to the last mentioned gaseous mixture is hereinafter referred to as Acceptor I$b$. Similarly, the acceptors of Examples II, III and IV are hereinafter referred to as Acceptors II$a$ and II$b$, III$a$ and III$b$, and IV$a$ and IV$b$.

The gaseous mixture was in each case preheated to 400° C. and charged upflow through the acceptor bed at a gaseous hourly space velocity (GHSV) of about 11,000. The reactor effluent was analyzed and discharged to the atmosphere through a wet test meter. After one hour, the solid acceptor was regenerated. Regeneration was by preheating a reducing gas to 400° C. and charging the reducing gas upwardly through the acceptor bed for 15 minutes at a gaseous hourly space velocity of 1000. Each of the acceptors was regenerated utilizing hydrogen admixed with carbon monoxide in a 1:1 mole ratio, the reducing gas being employed in a 1:4 mole ratio with steam. Again, the reactor effluent was analyzed and discharged to the atmosphere through a wet test meter. The solid acceptors were evaluated over about 8 acceptance-regeneration cycles. The average acceptance efficiency per acceptance cycle was determined, the acceptance efficiency being the actual capacity of the acceptor for sulfur oxides as a percentage of the sulfur oxides charged to the acceptor bed. The average regeneration efficiency per generation cycle was likewise determined after about 8 cycles, the regeneration efficiency being the percent of available copper reduced to the elemental metal during the regeneration cycle. The sulfur oxides acceptance efficiency, nitrogen oxides conversion efficiency, and the regeneration efficiencies are tabulated below.

| Acceptor | Efficiency | | |
|---|---|---|---|
| | $NO_x$ Conversion | $SO_2$ Acceptance | Regeneration |
| I$a$ | 53 | 76 | 83 |
| I$b$ | 77 | 76 | 83 |
| II$a$ | 58 | 86 | 97 |
| II$b$ | 91 | 86 | 97 |
| III$a$ | 2 | 93 | 96 |
| III$b$ | 1.8 | 93 | 96 |
| IV$a$ | 2.9 | 87.8 | 97 |
| IV$b$ | — | — | — |

I claim as my invention:

1. A process for the simultaneous separation of oxides of sulfur and nitrogen from a gaseous mixture containing said oxides and oxygen which comprises contacting said mixture and ammonia with a solid sulfur oxides acceptor at a temperature of from about 150° to about 450° C., said solid acceptor comprising copper, copper oxide, or a mixture thereof dispersed on a carrier material in combination with ruthenium and rhenium or the oxides wherein each of the ruthenium and rhenium components comprises for about 0.01 to about 2.0 wt. % of said solid acceptor calculated as the elemental metal.

2. The process of claim 1 further characterized in that said copper, copper oxide, or mixture thereof comprises from about 5 to about 15 wt. % of said solid acceptor.

3. The process of claim 1 further characterized in that said carrier material is an alumina with a surface area of at least about 50 m$^2$/gm.

4. The process of claim 1 further characterized in that said carrier material is gamma-alumina.

5. The process of claim 1 further characterized in that said carrier material is eta-alumina.

6. The process of claim 1 further characterized in that said ammonia is employed in from about a 0.1:1 to about a 2.5:1 mole ratio with the nitrogen oxides content of said gaseous mixture.

7. The process of claim 1 further characterized in that said solid acceptor is regenerated by heating the same in contact with a reducing gas comprising hydrogen and carbon monoxide and from about 50 to about 90 vol. % steam.

* * * * *